United States Patent [19]
Hassanein et al.

[11] Patent Number: 6,095,240
[45] Date of Patent: Aug. 1, 2000

[54] QUADRUPLE HEAT EXCHANGER

[75] Inventors: Hany E. Hassanein; James A. Bodhaine, both of Houston, Tex.

[73] Assignee: Vita International, Inc., Houston, Tex.

[21] Appl. No.: 09/108,710

[22] Filed: Jul. 1, 1998

[51] Int. Cl.[7] .................................................... F28D 7/10
[52] U.S. Cl. ........................ 165/141; 165/140; 165/163; 165/174
[58] Field of Search ........................ 165/140, 141, 165/156, 163, 174

[56] References Cited

U.S. PATENT DOCUMENTS

| | | |
|---|---|---|
| 1,279,135 | 9/1918 | Manville .................................. 165/140 |
| 1,526,320 | 2/1925 | Cook ...................................... 165/140 X |
| 2,888,251 | 5/1959 | Dalin ..................................... 165/163 X |
| 3,351,131 | 11/1967 | Berthold ............................... 165/174 X |
| 3,552,487 | 1/1971 | Tokumitsu et al. ...................... 165/174 |
| 4,197,712 | 4/1980 | Zwick . |
| 4,290,271 | 9/1981 | Granger . |
| 4,420,942 | 12/1983 | Davis . |
| 4,576,005 | 3/1986 | Force . |
| 4,586,338 | 5/1986 | Barrett . |
| 4,599,868 | 7/1986 | Lutjens . |
| 4,819,454 | 4/1989 | Brigham . |
| 4,899,544 | 2/1990 | Boyd . |
| 5,046,548 | 9/1991 | Tilly ........................................ 165/140 |
| 5,095,709 | 3/1992 | Billiot . |
| 5,228,505 | 7/1993 | Dempsey .............................. 165/140 |
| 5,309,987 | 5/1994 | Carlson .............................. 165/163 X |
| 5,551,242 | 9/1996 | Loesch . |

*Primary Examiner*—Leonard Leo
*Attorney, Agent, or Firm*—Paula D. Morris & Associates, P.C.; Cynthia G. Seal

[57] ABSTRACT

A heat exchanger having a plurality of coaxially aligned chambers for providing radiant, thermal heat transfer between a plurality of separately contained fluids within a single unit and a helical tube having at least one portion positioned within at least one of the chambers. A first, second, third, and fourth chambers are in coaxial alignment. The heat exchanger heats a cryogenic liquid to a gas phase using four different heat transfer fluids in one contained unit without mixing any of the fluids in the exchanger, thus reducing the size and cost, while increasing the efficiency of the heat exchanger.

43 Claims, 6 Drawing Sheets

QUADRUPLE HEAT EXCHANGER

FIELD OF THE INVENTION

This invention relates to a multiphase heat exchanger that provides radiant thermal heat transfer between a plurality of individually contained fluids.

BACKGROUND OF THE RELATED ART

Numerous operations are performed on oil and gas wells which require large volumes of nitrogen gas or other cryogenic fluids. These operations may be performed on both onshore and offshore wells. Such operations include foam fracturing operations, acidizing services, jetting down the tubing or down the tubing-casing annulus, nitrogen cushions for drill stem testing, pressure testing, insulation of the tubing-casing annulus to prevent such problems as paraffin precipitation, jetting with proppant for perforating and cutting operations, reduction of density of well workover fluids, displacement of well fluid from tubing during gun perforation operations to prevent excess hydrostatic pressure in the hole from pushing perforation debris into the formation, placing corrosion inhibitors by misting the inhibitor with nitrogen, extinguishing well fires, and other operations. Other operations that require cryogenic fluids at a high temperatures up to 400° F. include pipeline purging and drying operations, and refinery operations such as, recharging catalysts.

Nitrogen is typically stored in its liquid state because of the volume used however, liquid nitrogen will damage most carbon steel pipes used in oil and gas wells. Thus, various heating systems have been developed to raise the nitrogen to an ambient temperature. Typically, 185 BTUs per pound of nitrogen are required to heat the nitrogen to an ambient temperature of 70° F.

One particular such operation is the fracturing of a subsurface formation of the well by pumping a fluid under very high pressure into the formation. The fracturing fluid which is pumped into the well often comprises a foamed gel which is produced by the use of nitrogen gas. The nitrogen for the foam fracturing operation is generally stored in a fluid form at temperatures of approximately $-320°$ F.

At pressures encountered in these foam fracturing operations, the nitrogen changes state from a liquid to a gas at approximately $-200°$ F. It is, therefore, desirable to heat up the nitrogen gas so that the foam fracturing fluid being pumped down the well will be at an essentially ambient temperature. This is because of the numerous adverse affects upon mechanical equipment at very low temperature.

With regard to oil well operations, the nitrogen heating equipment generally includes open flame heaters. For example, with currently available technology, the only way to elevate the temperature of nitrogen to 400° F. is by using devices such as burners or direct fired unit-open flame units. For safety and environmental reasons, open flame heaters are generally not desirable or acceptable on offshore and onshore operations. Open flame heaters are banned from certain operations because they generate sparks and flames that could ignite surrounding vapors and typically the surface temperature on these units is above 250° F. which also creates safety hazards. Therefore, there is a need for a heater for the nitrogen which does not have an open flame and the heater does not generate surface temperatures above 250° F.

Such flameless nitrogen heaters have previously been provided by utilizing the heat generated by an internal combustion engine and mechanical components driven thereby to heat a coolant fluid which then transferred its heat to the nitrogen through a series of heat exchangers. Multiple heat exchangers ultimately add to the weight, space and cost of the unit. In addition, these heat exchangers typically do not arrest all of the flames and sparks emitted by the exhaust from the engine.

Numerous problems are encountered with other prior art devices mainly because of the use of air as a heat transfer medium. Air is a notoriously poor heat transfer medium as compared to a liquid. Additionally, due to the large bulky nature of the plenum chamber required for the use of air as a heat transfer medium, the air systems are typically very bulky and heavy.

Therefore, there is a need for a flameless nitrogen unit that is compact in size, efficient in the heat transfer process, and economical. There is also a need for a system that heats fluids to a desired temperature while quenching sparks and maintaining surface temperatures and exhaust temperatures at acceptable levels.

SUMMARY OF THE INVENTION

The present invention provides a heat exchanger that collects heat from four sources generated by a power source, such as an internal combustion engine and uses the heat to warm a fluid stream. At the same time, the fluid stream, such as nitrogen liquid, is used to cool some or all of the collected fluids to acceptable operating temperatures. The heat exchanger can have five preferably cylindrical chambers one inside the other in coaxial alignment. A helical tube is positioned inside the chambers to carry a fluid to be heated and/or vaporized using a heat exchange process. A first portion of the helical tube is positioned inside a first chamber, a second portion of the helical tube is positioned in a second chamber, a third portion of the helical tube is positioned in a third chamber, and a fourth portion of the helical tube is positioned in a fourth chamber. The chambers are adapted to allow the passage of the helical tube from one chamber to the next.

Preferably, the helical tube has a tube fluid flow therethrough such as nitrogen or some other cryogenic fluid. The first chamber has a first fluid flow therethrough, such as main hydraulic fluid from the drive system. The second chamber has a second fluid flow therethrough, such as case hydraulic fluid. The third chamber and the fifth have a third fluid flow therethrough, such as exhaust from the engine. The fourth chamber has a fourth fluid flow therethrough, such as coolant. The fluids in each of the chambers may be suited to accommodate variances in pressure and flow volume. Preferably, the walls of all the chambers inside the first chamber are made of a heat conducting material such as stainless steel, copper, brass or aluminum so that the fluids flowing therethrough can benefit from radiant heat transfer from one chamber to the next.

In a preferred embodiment, all of the fluids traveling through the heat exchanger are in a counter-flow relationship, such that, i.) the tube fluid flow through the first portion of the helical tube is in a counter-flow arrangement with the first fluid flow, ii.) the tube fluid flow through the second portion is in a counter-flow arrangement with the second fluid flow in the second chamber, iii) the tube fluid flow through the third portion is in a counter-flow arrangement with the third fluid flow in the third chamber, and iv) the fourth portion of the helical tube is in a counter-flow arrangement with the fourth fluid flow in the fourth chamber.

The fourth portion of the helical tube in the heat exchanger preferably forms an inner coil and an outer coil.

The tube fluid flow through the inner coil is in a counter-flow relationship with the fourth fluid flow and the tube fluid flow through the outer coil is in a parallel flow relationship with the fourth fluid flow. The tube fluid flow in the inner coil flows in a parallel-flow relationship with the fluid flow in the third and fifth chambers. The tube fluid flow in the outer coil flows in a counter-flow relationship with the fluid flow in the third and fifth chambers. The fourth fluid flows in a counter-flow relationship with the fluid flow in the third and fifth chambers.

In order to maximize the available surface area, the individual chambers of the heat exchanger may be equipped with spiral fins. The fins are positioned such that they spiral or turn in the same orientation as the helical tube portions within the chambers and they are positioned between the turns of the helical tube portions. The fins may be attached to the inner or outer walls of the chambers. The spiral orientation of the fins causes the fluid flowing through the individual chambers to have the same flow pattern as the helical tubes, increasing surface area contact and contact time, thus improving over all efficiency in a compact space. The fins can be positioned between some or all of the turns of the helical tubes.

A portion of the third fluid flow or exhaust passes through the third chamber and exposes the third portion of the first tube to the heat from the exhaust and a portion passes through the fifth chamber. The exhaust then exits through one end of the heat exchanger. In order to decrease the potential sparks and flames from the exhaust, the exhaust is passed through a diffuser at the inlet cone, a flame trap mesh element and an exit cone at the opposite end of the heat exchanger. The diffuser at the inlet cone disperses the flow of the exhaust. The exit cone has an internal spiral fin that causes the exhaust flow to move in a centrifugal motion. The diffuser and fined cone cause the sparks to rest. The flame trap mesh is installed on the exit side of the heat exchanger to trap any flames that may be generated by the engine exhaust.

The exhaust flow passes through six stages in the heat exchanger. First, the exhaust flow enters the heat exchanger through an inlet cone. The inlet cone expands the flow area of the exhaust, which in turn causes the exhaust pressure to drop and the velocity of the exhaust flow to increase. Second, the exhaust passes through a diffuser, causing the flow to be dispersed including any sparks and flames that may be present in the flow. Third, a first portion of the exhaust flow passes through the third chamber and a second portion passes through the fifth chamber. In the third chamber, the exhaust flow passes over the third portion of the helical tubes, further reducing the possibility of flames and/or sparks passing through the heat exchanger. In the fifth chamber, the exhaust flow encounters at least one mesh element, absorbing any remaining flames. Fourth, as the first and second portions of the exhaust stream exit the third and fifth chambers, where the bulk of the stream is forced to enter an exit cone through an opening in the exit cone. The exit cone has an outer cone and an inner cone with spiral fins between the inner and outer cone. Fifth, the exhaust flow enters the opening in the exit cone and passes between the inner and outer cones. The fins on the inner cone forces the exhaust stream into a centrifugal motion, causing any residual sparks and/or flames to be dispersed. Sixth, the exhaust stream after at least one turn between the inner and outer cones is mixed with a cryogenic fluid stream, such as nitrogen. The cryogenic fluid stream cools the exhaust stream and removes any possible remaining sparks and/or flames in the exhaust stream and provides the ability to control the temperature of the exiting exhaust stream.

Mixing the exiting exhaust stream with a cryogenic liquid, such as nitrogen can be accomplished manually by a manual control valve adjusted by the operator of the unit to maintain an acceptable exhaust temperature. This is particularly important in hazardous areas where exhaust temperature is not to exceed 400° F.

In a preferred embodiment, the exhaust temperature may be controlled by a control system including an automated proportional valve, such as a solenoid valve, a pyrometer, an electric controller and a electrical valve actuator. The pyrometer senses the exhaust temperature, sending signals to the controller which in turn sends a signal to the electrical valve actuator increasing or decreasing the amount of liquid nitrogen flowing into the exhaust stream by opening and closing the solenoid valve, thus adjusting the exhaust temperature exiting the heat exchanger to the atmosphere.

There is an inlet exhaust pipe connecting the exhaust source to the inlet cone on the heat exchanger and an outlet exhaust pipe connected to the exit cone. The inlet exhaust pipe, outlet exhaust pipe, inlet cone, and outlet cone are coated on their outside surfaces, with a heat insulating material to maintain the outer surface temperature at a lower value than the inside surface temperature. The insulating material can be a ceramic coating or any other insulating material that will keep the surface temperature below 250° F. Maintaining a surface temperature of less than 250° F. is required by regulation in areas where volatile vapors are present.

Auxiliary pumps may be used to conduct the fluids through the helical tube and the chambers to compensate for any pressure drop that is incurred as the fluids flow through the heat exchanger.

In another embodiment, a system is provided for heating a tube fluid. The system includes a fluid source such as liquid nitrogen or other cryogenic fluid, a power source such as a drive system including a pump, such as a triplex nitrogen pump connected to the fluid source. The power source may include an internal combustion engine such as a diesel engine from Detroit, Caterpillar or other commercially available source for driving a hydraulic pump that provides hydraulic fluid to run a hydraulic motor that drives the nitrogen pump in addition to other pumps required to transport the other fluids through the system. A heat exchanger is used for providing a first fluid flow, such as main hydraulic fluid, from the hydraulic driving system in heat exchange relationship with the tube fluid to heat and or vaporize the tube fluid. The heat exchanger further provides a second fluid flow, such as case hydraulic fluid from the hydraulic pumps for further heating the cryogenic fluid in a heat exchange relationship. The heat exchanger also provides a third fluid flow, such as exhaust from the engine for heating the fluid and a fourth fluid flow such as engine coolant. The heat exchanger is designed such that the first fluid flow, second fluid flow, third fluid flow, fourth fluid flow and the tube fluid flow do not mix.

In a preferred embodiment, the tube fluid is nitrogen, the first fluid flow is substantially main hydraulic, the second fluid flow is substantially case hydraulic, the third fluid flow is substantially exhaust, and the fourth is substantially water, however other fluids may be substituted to achieve specific heat transfer goals of a particular system. A valve element may be positioned in communication with the tube fluid flow, in this case nitrogen gas, allowing a cryogenic fluid to be mixed with the heated tube fluid exiting the heat exchanger as a means for controlling the tube fluid temperature as it exits the heat exchanger.

The heat exchanger described herein provides for multiple heat exchange relationships between the fluids used in one contained unit. The first fluid flow is in heat exchange relation with the tube fluid flow, such that the first fluid flow and the tube fluid flow do not mix. The second fluid flow in is heat exchange relation with the tube fluid flow, such that the second fluid flow and the tube fluid flow do not mix.

The first portion of the third fluid flow is in heat exchange relation with the tube fluid flow, such that the first portion of the third fluid flow and the tube fluid flow do not mix. The first portion of the third fluid flow is in heat exchange relation with the second fluid flow, such that the first portion of the third fluid flow and the second fluid flow do not mix. The first portion of the third fluid flow is in heat exchange relation with the fourth fluid flow, such that the first portion of the third fluid flow and the fourth fluid flow do not mix. The second portion of the third fluid flow in is heat exchange relation with the fourth fluid flow, such that the second portion of the third fluid flow and the fourth fluid flow do not mix.

With regard to the radiant heat transfer from one chamber to the helical tube in an adjacent chamber, the heat from the first portion of the third fluid flow is transferred to the second portion of the helical tube through the second fluid flow. The heat from the first portion of the third fluid flow is transferred to the fourth portion of the helical tube through the fourth fluid flow. The heat from the second portion of the third fluid flow is transferred to the fourth portion of the helical tube through the fourth fluid flow. The second and fourth fluid flows are used as heat transfer mediums to transfer the heat obtained from the adjacent chamber into the helical tube portion that is contacted by the second and fourth fluid flows.

The fourth fluid flow in heat exchange relation with the tube fluid flow, such that the fourth fluid flow and the tube fluid flow do not mix.

The first portion of the third fluid flow and the second portion of the third fluid flow are in heat exchange relation with a cryogenic liquid in the exit cone. The first and second portion of the third fluid and the cryogenic fluid mix in the exit cone to cool the exhaust flow as it exits the heat exchanger.

In another embodiment of the present invention, there is provided a flameless fluid heating system for heating fluids such as cryogenic fluids. This system is useful for using exhaust flows to heat fluids where flameless conditions are required and the most useful heat source is an engine such as a diesel engine. The system has a heat exchanger with at least one fluid inlet and at least one fluid outlet. There is an entrance portion in flow communication with the fluid inlet and an exit portion in flow communication with the fluid outlet and a heat insulating element. The entrance portion has a diffuser preferably defining a plurality of openings therein, and an inside surface and an outside surface. The diffuser is designed to reduce sparks that are generated by an exhaust flow. The exit portion has an inner portion and an outer portion, preferably separated by a spiral fin forming a spiral flow path. The outer portion has an outside surface and the inner portion has an inside surface. The heat insulating element, preferably ceramic, is positioned adjacent to the outside surface of the entrance portion and the outside surface of the outer portion, for maintaining the outside surfaces at a desired temperature.

Preferably, the entrance portion, the exit portion, the inner portion, and the outer portion are conical in shape and the inner portion includes an entrance opening and the outer portion has an exit opening. In addition, a flame trap mesh screen, made of stainless steel or other similar material may be positioned near the exit portion to further arrest any flames or sparks that may be present in the exhaust flow. The heat insulating element may coat all outside surfaces that are made of stainless steel or other highly conductive material so that when a hot fluid such as exhaust is passed through the heat exchanger, the outside surfaces of the coated portions will maintain a temperature below 250° F. The heat insulating element is a material that has poor heat conducting qualities such as ceramic.

In yet another embodiment, there is provided a method for arresting at least a portion of sparks and flames present in a heated fluid flow. Preferably, all of the flames and sparks are arrested using this method. The term "arresting" is used here to mean that the flames and sparks are stopped by the method described. This method may be employed using the system or heat exchanger described above or with a similar system. The heated fluid flow is passed to a chamber having a fluid inlet and a fluid outlet, and an entrance portion in flow communication with the fluid inlet. The heated fluid flow is passed through a diffuser to a central portion of the chamber. The heated fluid flow is passed through a flame trapping element, such as the flame trap mesh described below. The heated fluid flow is then passed through an exit portion in flow communication with the fluid outlet. Preferably, the heated fluid flow is forced into a spiral flow path formed by the exit portion.

A heat insulating element may be positioned adjacent to an outside surface of the entrance portion and an outside surface of the exit portion for maintaining the outside surfaces at a desired temperature. The heat insulating element may be ceramic or some other material having poor heat conductivity.

In order to further reduce sparks and flame in the heated fluid flow, the heated fluid flow may be exposed to a heat transfer fluid to transfer heat away from the heated fluid flow. The heat transfer fluid and the heated fluid flow do not mix. The heat transfer fluid may be contained in a helical tube much like that described above. In addition, the heated fluid flow may be exposed to a cryogenic fluid, which will mix with the heated fluid flow to reduce the temperature of the heated fluid flow and arrest any residual sparks and/or flames. This step may be performed as the heated fluid flow exits the chamber.

The heat exchanger disclosed herein is designed to provide a maximum rate of heat transfer with minimum heat loss to the atmosphere, which increases efficiency, decreases the horse power requirement, allows for a smaller engine, and lower cost for providing cryogenic fluids at ambient and high temperatures up to 400° F. In addition, the present heat exchanger controls the surface temperature of the unit as well as quenching any sparks or flames that may exist in the exhaust flow prior to entering the atmosphere.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

One aspect of the present invention provides a heat exchanger that collects heat through radiant transfer from hydraulic fluids, coolant fluid and exhaust gases and transfers the heat to the nitrogen, which exits the heat exchanger at controllable temperature between 70–400° F. During the heat transfer process, the hydraulic fluids give up heat to the nitrogen and are cooled to a reasonable operating temperature by the liquid nitrogen. The hydraulic fluids then travel out of the heat exchanger and into the hydraulic pump when a closed loop hydraulic system is being used or into the hydraulic tank when an open loop system is being used. The nitrogen liquid travels in one direction down the heat exchanger through the first chamber, to one end of the heat exchanger, then reverses direction and travels in the opposite direction in the second chamber and then to the fourth chamber. While in the fourth chamber, the nitrogen is warmed by the engine coolant. The nitrogen then travels to the third chamber where it is further heated by the exhaust stream flowing over the tube carrying the nitrogen. The fluids in each chamber fill the chamber surrounding the tube carrying the nitrogen. Preferably, all the fluids in this system flow in a counter flow arrangement to maximize the radiant heat transfer process. The heat exchanger reduces the amount of heat lost, thereby increasing the efficiency of the heat transfer, and reducing the size engine required to generate the required amount of heat. Using a smaller engine will save space as well as money. For example, the heat exchanger of the present invention may be used to heat and/or vaporize nitrogen at a rate of 180 K scf/h using a 315 HP engine. Currently available systems require a 380 HP engine to achieve similar results.

The temperature of the nitrogen exiting the system is related to the amount of heat generated by the system. The heat generated by the system can be balanced by controlling the velocities of fluids flowing through the heat exchanger. The engine runs at a constant speed, therefore, the coolant velocity is relatively constant. The nitrogen is delivered through a hydraulically driven nitrogen pump that is powered by a hydraulic motor, which is supplied with hydraulic fluid from the engine driven hydraulic pump. The nitrogen flow rate dictates the amount of horsepower output required from the hydraulic motor. A high nitrogen flow rate increases the amount of hydraulic oil demand from the engine, and increases the horsepower output, which in turn increases the heat created by the hydraulic oils, coolant, and exhaust.

In another aspect of the invention, there is provided a heat exchanger that employs a radial design for transferring heat from several sources into a fluid stream in one contained unit. The design includes a radial arrangement of one continuous flow tube and several chambers that are self-contained to reduce heat loss from one heat transfer phase to the next. The unit is designed to provide multiphase heat transfer using engine coolant, hydraulic fluids and exhaust from an external engine to heat and/or vaporize nitrogen, cooling the hydraulic fluids and the engine coolant to an operating temperature as well as reduce the temperature of waste exhaust. The heat exchanger is based on radiant heat transfer from the hydraulic fluids, engine coolant and exhaust into liquid nitrogen or other cryogenic fluid in an efficient manner. In addition, from safety point of view, cryogenic fluids that are normally vented to atmosphere during cool downs or pump priming, can be vented directly into the exhaust stream, vaporizing the cryogenic fluids prior to entry to the atmosphere.

In yet another aspect of the present invention, there is provided a radially designed heat exchanger that muffles the exhaust coming from the engine. The exhaust is fed through a cone and a diffuser, where the flow area expands causing the exhaust pressure to drop. The exhaust then passes through at least one cylindrical chamber and is collected by the exit cone. Having a cone at the entrance and exit of the heat exchanger causes the expansion of the exhaust flow area which in turn results in a dramatic reduction in noise. In addition, there is an insulating material present on the outside surfaces of the inlet and exit cones so that the outside surface temperature does not exceed 250° F.

Figure 1:
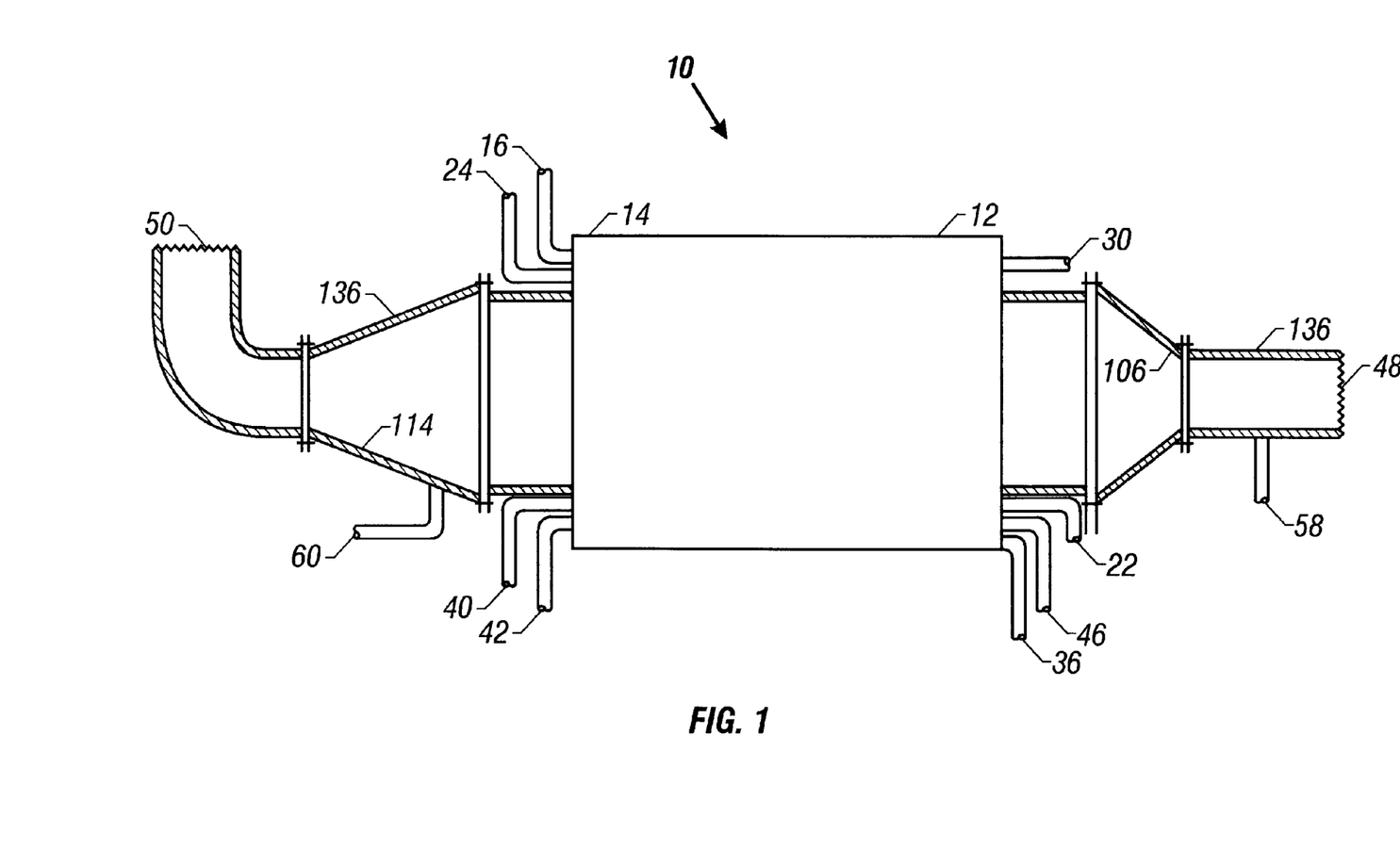
FIG. 1 is a perspective view of the heat exchanger of the present invention.

FIG. 1 is a perspective view of the heat exchanger 10 of the present invention. The heat exchanger 10 has a first end 12 and a second end 14. A liquid nitrogen inlet 16 is located near the second end 14 and a gaseous nitrogen outlet 22 is located near the first end 12. The engine coolant enters the heat exchanger 10 through coolant inlet 24 and exits through coolant outlet 30. The engine main hydraulic fluid enters through hydraulic inlet 36 and exits through hydraulic outlet 40. The case hydraulic fluid enters through inlet 42 and exits through outlet 46. The engine exhaust enters through exhaust inlet 48 and exits through exhaust outlet 50. Nitrogen that is normally vented to the atmosphere from various pumps, can be vented into the exhaust stream through a vent line 58. If the engine is working very hard and producing exhaust that is too hot to be vented to the atmosphere, the exhaust can be cooled by injecting a small amount of liquid nitrogen into the exhaust stream near the second end of the heat exchanger 10 through inlet 60. The outside surfaces of the inlet and exit cones are coated with an insulating material 136 such as ceramic to keep the outside surface temperature below 250 F.

Figure 2:
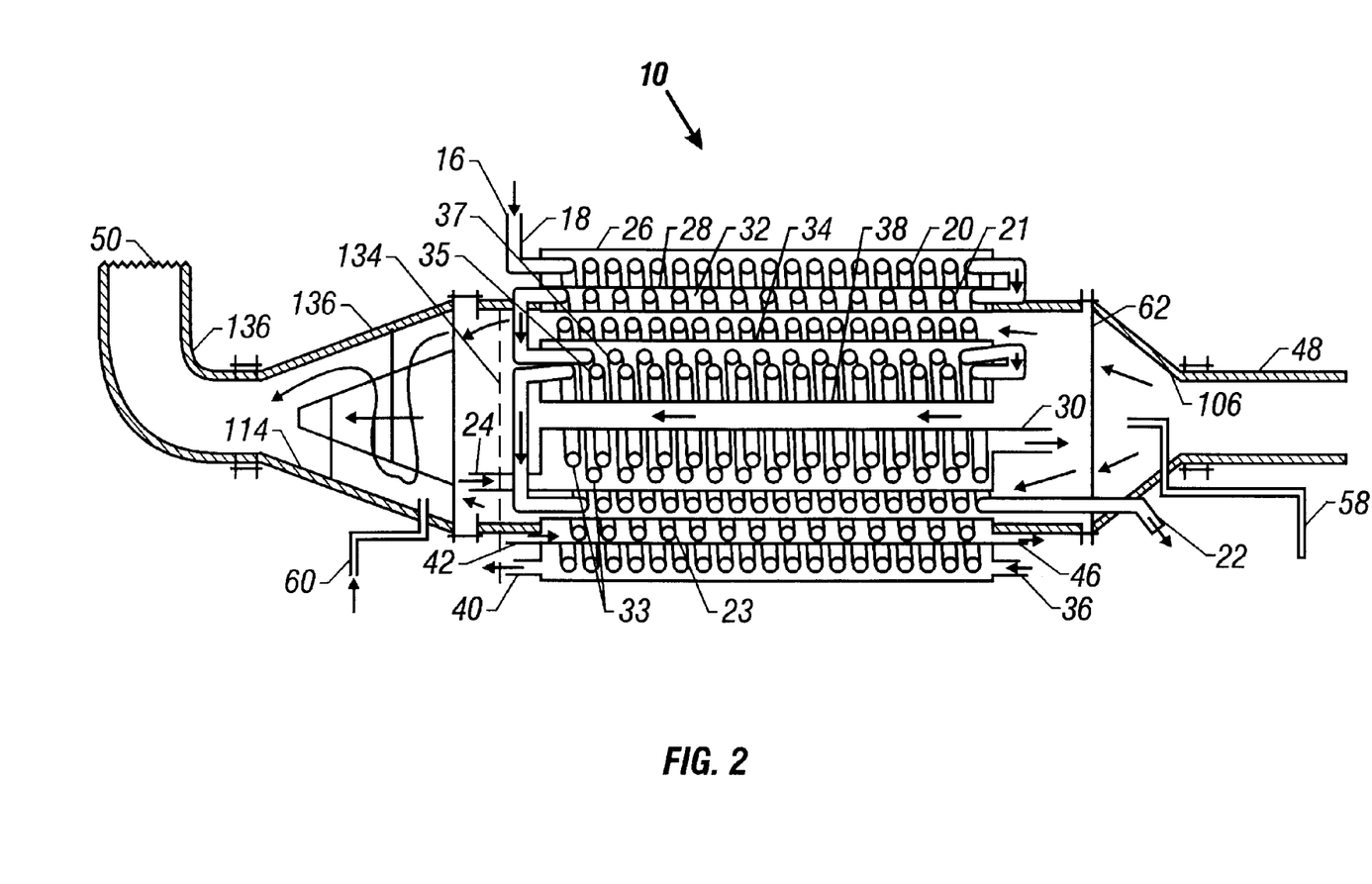
FIG. 2 is a cross-sectional view of the heat exchanger shown in FIG. 1.

FIG. 2 is a cross-sectional view of heat exchanger 10 taken along lines A—A. The heat exchanger 10 has a first cylindrical chamber 26, a second cylindrical chamber 28, a third cylindrical chamber 32, a fourth chamber 34, and a fifth chamber 38. A helical tube 18 is shown with a first portion 20 positioned inside the first chamber 26, a second portion 21 positioned inside the second chamber 28, a third portion 23 positioned inside the third chamber 32, and a fourth portion 33 positioned inside the fourth chamber 34. Starting at the second end 14, the nitrogen inlet 16 communicates with the first portion 20 of the helical tube 18 and the nitrogen outlet 22 communicates with the third portion 23 of the helical tube 18. Coolant inlet 24 communicates with the fourth chamber 34 near the second end 14, and coolant outlet 30 communicates with the fourth chamber 34 near the first end 12. Main hydraulic inlet 36 communicates with the first chamber 26 near the first end 12, and main hydraulic outlet 40 communicates with the first chamber near the second end 14. The exhaust inlet 48 communicates with the third chamber 32 near the first end 12 and the fifth chamber 38 and the exhaust outlet 50 communicates with the third and fifth chambers 32, 38 near the second end 14.

The nitrogen enters inlet 16 and travels through the helical tube 18 through the first chamber 26 where it is warmed by the main hydraulic fluid, to the second chamber 28 where it is warmed by the case hydraulic fluid, to the fourth chamber 34 where it is warmed by the coolant, and to the third chamber 32 where it is finally warmed by the exhaust stream.

The helical tube in the fourth chamber 34 forms an inner coil 35 and an outer coil 37. The nitrogen or tube fluid flow in the outer coil 37 flows in a parallel relationship with the fourth fluid flow or coolant in the fourth chamber 34 and the tube fluid flow in the inner coil 35 flows in a counter-flow relationship with the fluid flow in the fourth chamber 34. Likewise, the fluid flow in the fourth chamber flows in a counter-flow relationship with the fluid flow in the fifth chamber 38 and the third chamber 32. The parallel fluid flow arrangement provides a high temperature differential when the nitrogen and the coolant meet at coolant inlet which allows for a high rate of heat transfer while the counter flow relationship in the inner coil provides an average temperature differential with the nitrogen as it exits the fourth chamber. In addition, there are spiral fins positioned between the helical tubes of the inner and outer coils in the fourth chamber 34 to increase the heat transfer between the tube fluid and the chamber fluid and ensure a chamber fluid flow following the tube pattern throughout the fourth chamber 34.

The fifth chamber 38 and the third chamber 32 are in heat exchange relation with the coolant in the fourth chamber such that heat from the exhaust is transferred to the coolant and ultimately transferred through the coolant to the nitrogen in the fourth portion of the helical tube.

An inlet cone 106 is positioned in flow communication with the first end 12 of the heat exchanger 10. Shown in more detail in FIGS. 4 and 5, a diffuser 62 defining a plurality of openings therein is positioned downstream of the inlet cone 106. The inlet cone 106 also has a fluid inlet 58 for allowing the passage of cryogenic fluids from pumps or other devices that are normally vented to atmosphere.

It is important to note that the fluid flows through the individual chambers may be changed depending on the engine used, the hydraulic system used, and the flow volume and/or the pressure of the fluids. For example, the coolant flow may be through the second chamber instead of the fourth chamber.

Each chamber preferably includes a spiral fin that is positioned between the turns of at least some of the helical tubes to direct fluid flows and maximize the surface area and contact time of the tubes exposed to the fluids. The spiral fins are preferably made from stainless steel.

The inner wall of the first chamber 26 can be made from a heat transfer material such as brass, stainless steel, aluminum or copper, most preferably, stainless steel. The walls of the second, third and fourth chambers may also be made from a heat transfer material such as stainless steel, copper, brass, aluminum or mixtures thereof, preferably stainless steel, to maximize the radiant heat transfer between the exhaust, the hydraulic fluids, the coolant, and the tube fluid.

Figure 3:
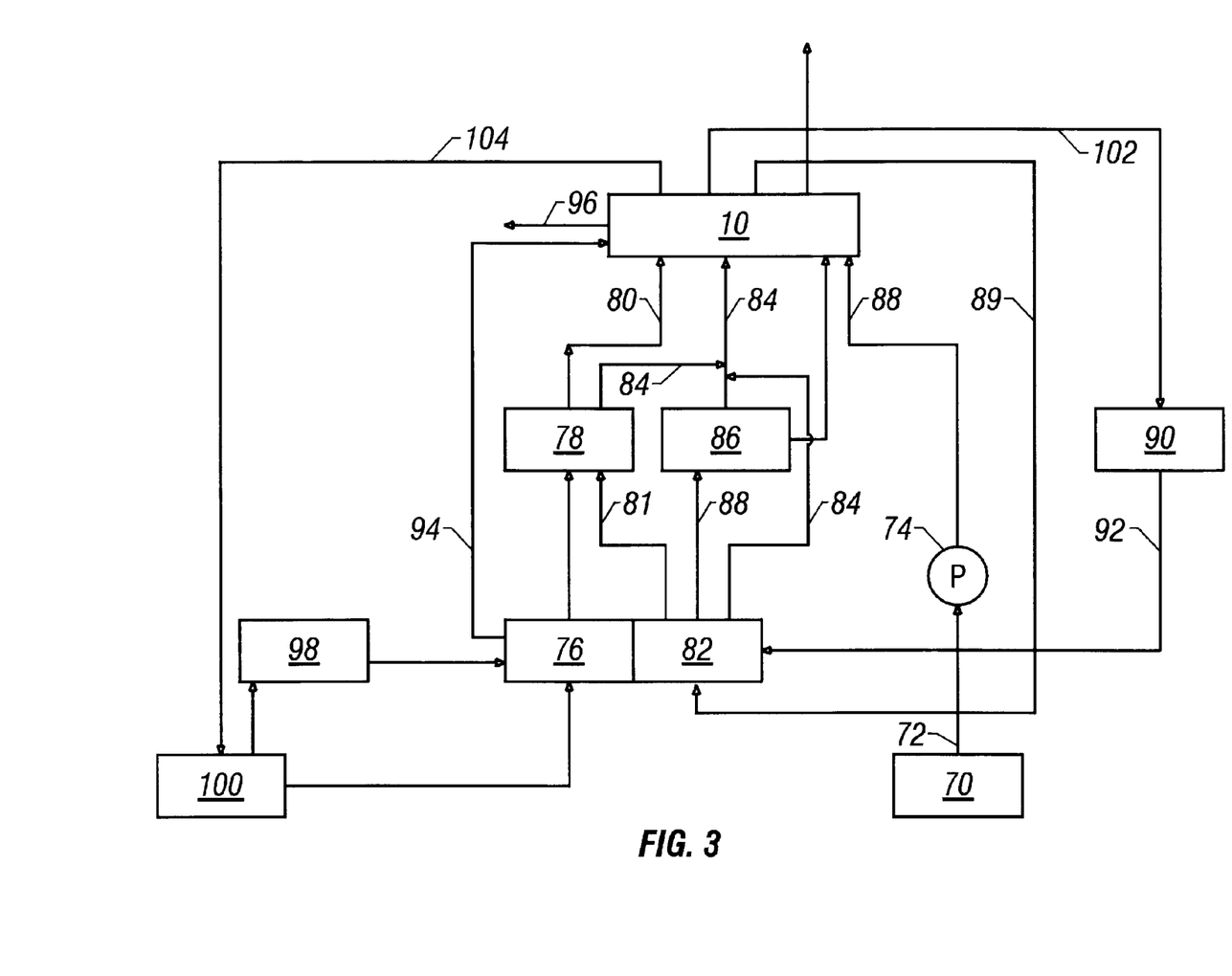
FIG. 3 is a schematic of a system using the heat exchanger of the present invention.

FIG. 3 is a schematic of a system using the heat exchanger of one embodiment of the present invention. A triplex nitrogen pump 74 is used to send nitrogen from a nitrogen source 70 through conduit 72 to the heat exchanger 10. The pump 74 is driven by a hydraulic motor 86. The engine 76 drives the hydraulic pump 82 which supplies hydraulic fluid to motor 86 and other hydraulic motors in the system. The coolant fluid from the engine 76 is pumped into the heat exchanger 10 through a coolant pump 78 and conduit 80. The case drain and return hydraulic fluid from a hydraulic pump 82, coolant pump 78 and hydraulic motor 86 are sent to the heat exchanger 10 through via conduit 84 and exit the heat exchanger through conduit 102 to a hydraulic fluid source 90. Main hydraulic fluid from hydraulic pump 82, hydraulic actuated motor 86 is transferred to heat exchanger 10 through conduit 88 and returns to the hydraulic pump 82 through conduit 89 which completes a closed loop between hydraulic motor 86 and hydraulic pump 82. The hydraulic pump 82 is connected to a hydraulic fluid source 90 via conduit 92. The engine exhaust is transferred to the heat exchanger 10 through conduit 94 and exits the heat exchanger through conduit 96. Once the coolant exits the heat exchanger 10, it is transferred to either the engine radiator 98 or to the water pump in the engine 76. The coolant flow flows from the heat exchanger 10 through conduit 104 to a thermostatic valve 100 for regulating flow of the coolant, so that if the coolant temperature is too high the coolant is transferred to the engine radiator 98.

It is desirable for certain applications that the nitrogen be within a certain temperature range. In order to achieve a certain temperature range, a self-controlled tempering valve connected to a nitrogen source may be used to add liquid nitrogen to the nitrogen gas exiting the system if the temperature is too high.

Figure 4:
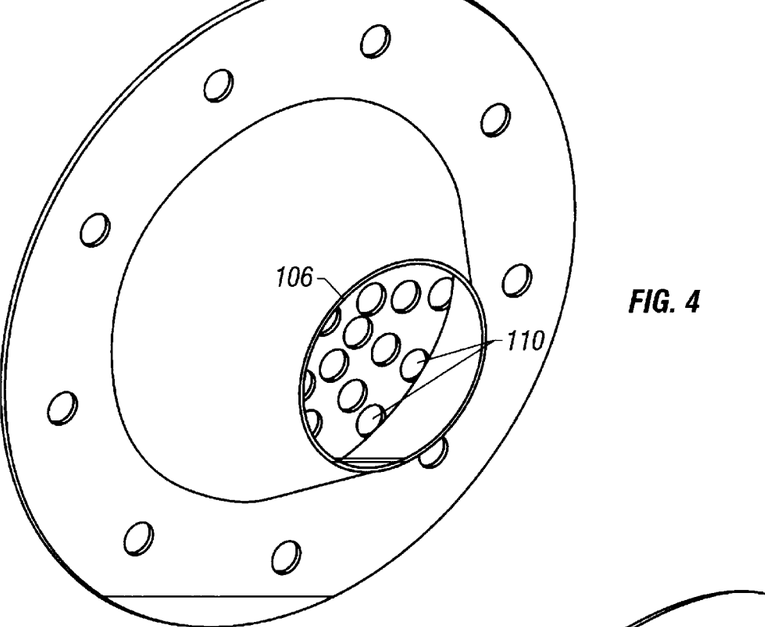
FIG. 4 is a perspective view of an inlet cone of the present invention.
Figure 5:
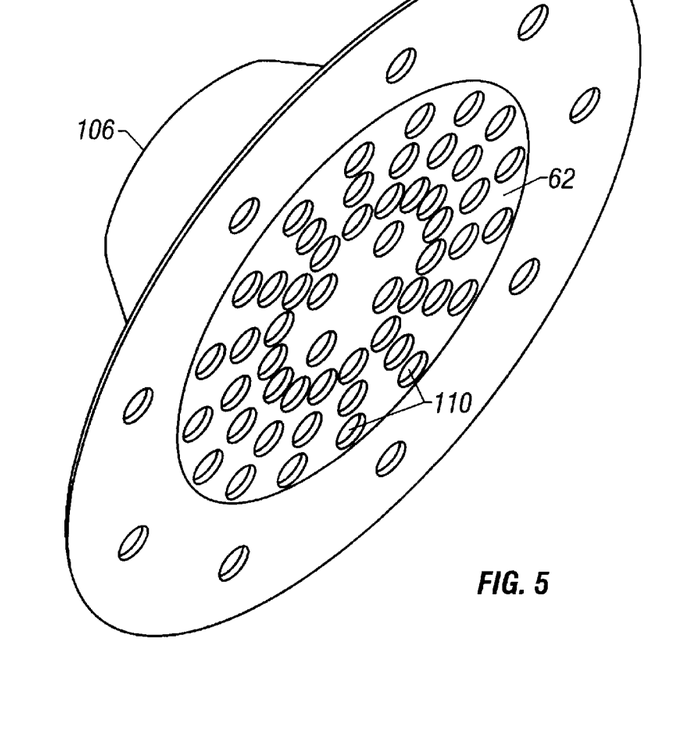
FIG. 5 is a perspective view of the diffuser of the present invention

FIGS. 4 and 5 are a perspective view of the inlet cone 106 and diffuser 62 of the present invention. The cone 106 is attached, typically with bolts, to the first end of the heat exchanger, in communication with a pipe for receiving the exhaust flow from an engine. The cone 106 has a diffuser 62 which consists of a generally flat plate defining holes 110 therethrough. The diffuser 62 and cone 106 act to reduce engine noise as the exhaust passed through the inlet cone and into the heat exchanger.

Figure 6:
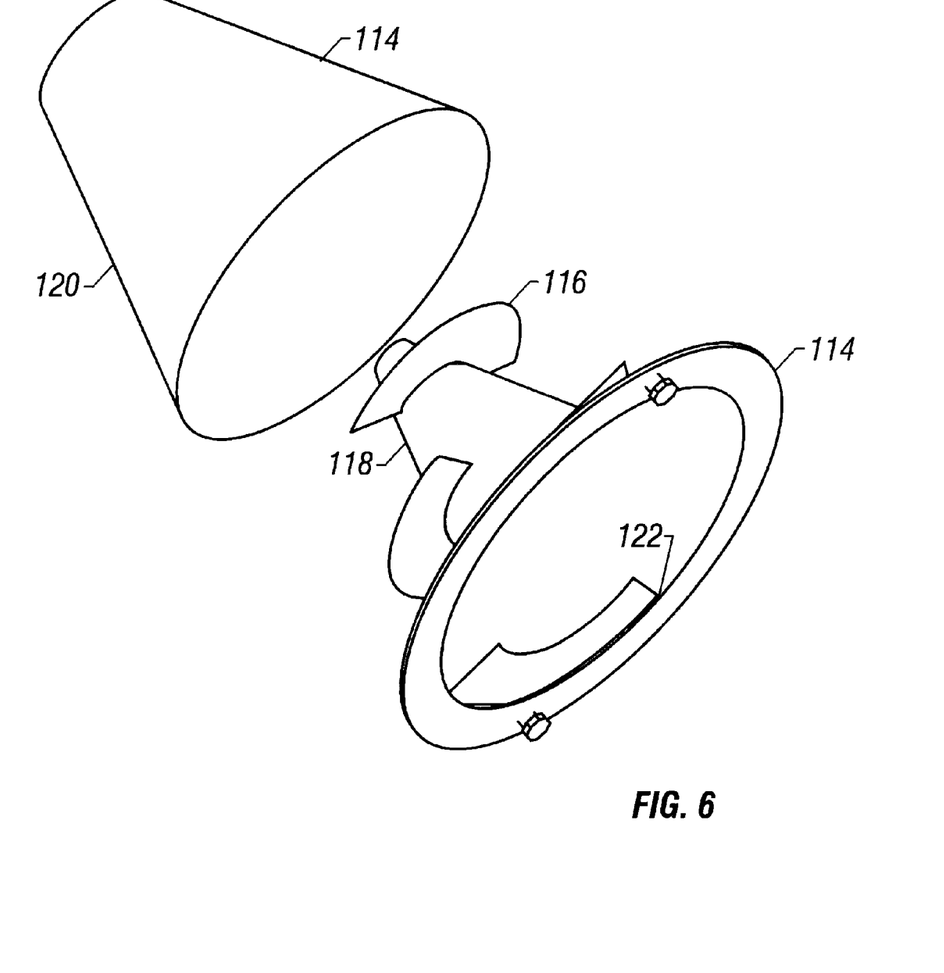
FIG. 6 is an exploded view of an exit cone with a spiral fin.

FIG. 6 is an exploded view of an exit cone 114 that is attached to the second end 14 of the heat exchanger. The exit cone 114 comprises an inner cone 118 and an outer cone 120. The inner cone 118 has a spiral fin 116 positioned between the inner and outer cones. A diffuser 62 like that described above or preferably a flame trap metal mesh screen 134 may be placed upstream of the exit cone 114. The exhaust exits the third and fifth chambers and enters the exit cone 114 through opening 122 wherein it is forced by the spiral fin 116 to travel around the inner cone causing the exhaust to move in a centrifugal pattern, which reduces any remaining sparks in the exhaust flow.

Figure 7:
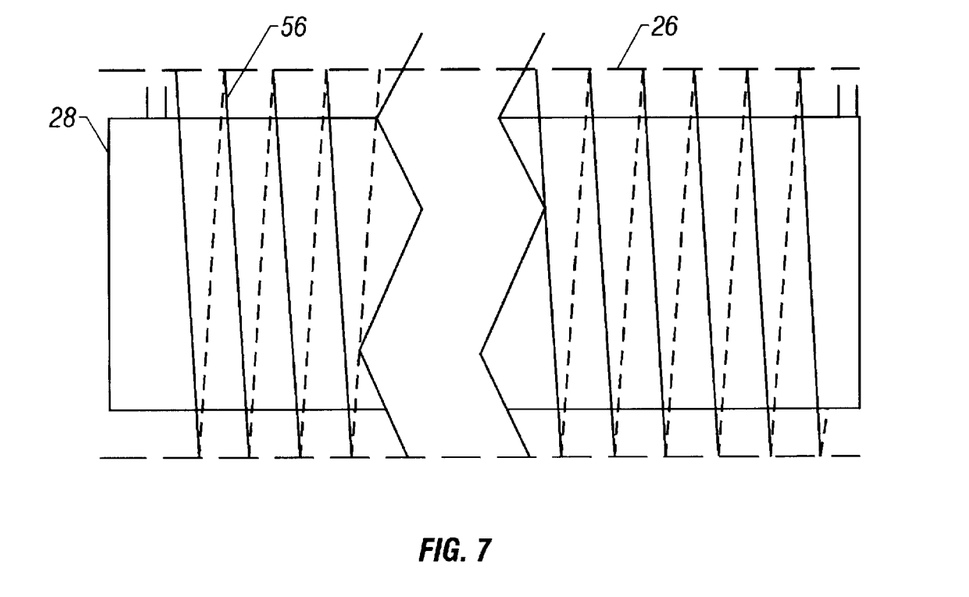
FIG. 7 is a schematic view of the spiral fins used in the chambers in the present invention.

FIG. 7 is a schematic view of the spiral fins used in the present invention. For clarity, the first chamber 26 is shown in dotted lines and the helical tube has been removed. The fins 56 are positioned around the outside of the second chamber 28 for directing the fluid flow through the first chamber so that the fluid contacts the maximum surface area of the helical tube passing through the first chamber 26, thus increasing the heat transfer efficiency of the system, through maximizing exposure time and surface contact area. Spiral fins are preferably positioned in the first, second and fourth chambers, however it possible to position spiral fins in the third chamber as well.

Figure 8:
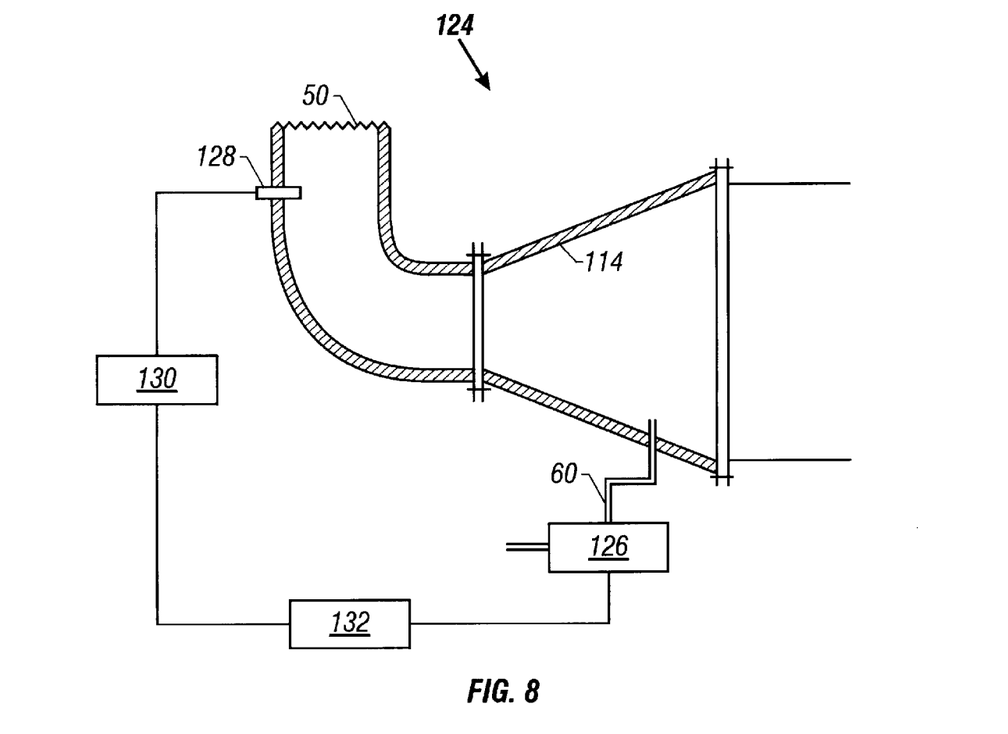
FIG. 8 is a schematic view of a controller system of the present invention.

FIG. 8 is a schematic view of the control a control system 124. The control system 124 has an automated proportional valve 126, such as a solenoid valve, a pyrometer 128, an electric controller 130 and a electrical valve actuator 132. The pyrometer 128 senses the exhaust temperature, sending signals to the controller 130 which in turn sends a signal to the electrical valve actuator 132 increasing or decreasing the amount of liquid nitrogen flowing into the exhaust stream through fluid line 60 by opening and closing the solenoid valve 126. Thus adjusting the exhaust temperature exiting the heat exchanger to the atmosphere.

While the foregoing is directed to the preferred embodiment of the present invention, other and further embodiments of the invention may be devised without departing from the basic scope thereof, and the scope thereof is determined by the claims which follow.

We claim:

1. A heat exchanger comprising:
   a first chamber having at least one inlet;
   a second chamber having at least one inlet, wherein the second chamber is positioned inside the first chamber;
   a third chamber having at least one inlet, wherein the third chamber is positioned inside the second chamber,
   a fourth chamber having at least one inlet, wherein the fourth chamber is positioned inside the third chamber, and
   a helical tube having an inlet, wherein at least a portion of the helical tube is disposed in the first, second, third and fourth chambers, wherein the first, second, third and fourth chambers are in coaxial alignment, wherein the helical tube has a tube fluid flow therethrough, the first chamber has a first fluid flow therethrough, the second chamber has a second fluid flow therethrough, the third chamber has a first portion of a third fluid flow therethrough, and the fourth chamber has a fourth fluid flow therethrough, wherein the first, second, third, fourth, and tube fluid flows do not mix.

2. The heat exchanger of claim 1, further comprising a fifth chamber having at least one inlet, wherein the fifth chamber is positioned inside the fourth chamber, wherein the fifth chamber has a second portion of the third fluid flow therethrough.

3. The heat exchanger of claim 2, wherein the second portion of the third fluid flow in is heat exchange relation with the fourth fluid flow, wherein the second portion of the third fluid flow and the fourth fluid flow do not mix.

4. The heat exchanger of claim 2, wherein heat from the second portion of the third fluid flow is transferred to the fourth portion of the helical tube through the fourth fluid flow.

5. The heat exchanger of claim 2, wherein the first portion of the third fluid flow and the second portion of the third fluid flow are in heat exchange relation with a cryogenic liquid in an exit cone positioned at one end of the heat exchanger, wherein the first and second portion of the third fluid and the cryogenic fluid mix in the exit cone.

6. The heat exchanger of claim 5, wherein the cryogenic liquid flow causes sparks and flames present in a fluid flow to rest.

7. The heat exchanger of claim 1, wherein the helical tube has a first portion disposed within the first chamber, a second portion disposed within the second chamber, a third portion disposed within the third chamber and a fourth portion disposed within the fourth chamber.

8. The heat exchanger of claim 7, wherein the tube fluid flow through the first portion is in a counter-flow arrangement with the first fluid flow in the first chamber.

9. The heat exchanger of claim 7, wherein the tube fluid flow through the second portion is in a counter-flow arrangement with the second fluid flow in the second chamber.

10. The heat exchanger of claim 7, wherein the tube fluid flow through the third portion is in a counter-flow arrangement with the third fluid flow in the third chamber.

11. The heat exchanger of claim 7, wherein the fourth portion of the helical tube forms an inner coil and an outer coil, wherein the tube fluid flow through the inner coil is in a counter-flow relationship with the fourth fluid flow and the tube fluid flow through the outer coil is in a parallel flow relationship with the fourth fluid flow.

12. The heat exchanger of claim 1, wherein the first, second, third, and fourth chambers are generally cylindrical.

13. The heat exchanger of claim 1, further comprising at least one spiral fin positioned between the turns of a portion of the helical tube.

14. The heat exchanger of claim 1, further comprising a spiral fin positioned inside the fourth chamber, wherein at least some of the turns of the spiral fin are positioned between at least some of the turns of the fourth portion of the helical tube.

15. The heat exchanger of claim 1, further comprising an inlet cone in flow communication with one end of the heat exchanger and a diffuser defining a plurality of openings therein positioned downstream of the inlet cone.

16. The heat exchanger of claim 15, wherein the inlet cone further comprises an inside surface and an outside surface, wherein the outside surface is coated with an insulating material, so that the outside surface of the inlet cone has a lower temperature than the inside surface of the inlet cone.

17. The heat exchanger of claim 15, further comprising an exit cone in flow communication with the opposite end of the heat exchanger, wherein the exit cone comprises an inlet and an outlet, an inner cone, and an outer cone, wherein the inner cone has a spiral fin extending between the inner cone to the outer cone to form a spiral flow path between the inner cone and the outer cone.

18. The heat exchanger of claim 17, wherein the exit cone further comprises an inside surface and an outside surface, wherein the outside surface is coated with an insulating material, so that the outside surface of the exit cone has a lower temperature than the inside surface of the exit cone.

19. The heat exchanger of claim 1, wherein the first fluid flow is in heat exchange relation with the tube fluid flow, wherein the first fluid flow and the tube fluid flow do not mix.

20. The heat exchanger of claim 1, wherein the second fluid flow in heat exchange relation with the tube fluid flow, wherein the second fluid flow and the tube fluid flow do not mix.

21. The heat exchanger of claim 1, wherein the first portion of the third fluid flow is in heat exchange relation with the tube fluid flow, wherein the first portion of the third fluid flow and the tube fluid flow do not mix.

22. The heat exchanger of claim 1, wherein the fourth fluid flow in heat exchange relation with the tube fluid flow, wherein the fourth fluid flow and the tube fluid flow do not mix.

23. The heat exchanger of claim 1, wherein the first portion of the third fluid flow is in heat exchange relation with the second fluid flow, wherein the first portion of the third fluid flow and the second fluid flow do not mix.

24. The heat exchanger of claim 1, wherein the first portion of the third fluid flow is in heat exchange relation with the fourth fluid flow, wherein the first portion of the third fluid flow and the fourth fluid flow do not mix.

25. The heat exchanger of claim 1, wherein heat from the first portion of the third fluid flow is transferred to the second portion of the helical tube through the second fluid flow.

26. The heat exchanger of claim 1, wherein heat from the first portion of the third fluid flow is transferred to the fourth portion of the helical tube through the fourth fluid flow.

27. A heat exchanger comprising:

a plurality of coaxially aliged chambers for providing radiant, thermal heat transfer between a plurality of fluids; and a helical tube having at least one portion positioned within at least one of the chambers, wherein the helical tube has an inlet and an outlet, wherein the plurality of chambers comprises a first chamber having at least one inlet;

a second chamber disposed in the first chamber, wherein the second chamber has at least one inlet;

a third chamber disposed in the second chamber, wherein the third chamber has at least one inlet;

a fourth chamber disposed in the third chamber, wherein the fourth chamber has at least one inlet; and a fifth chamber disposed in the fourth chamber, wherein the fifth chamber has at least one inlet, wherein the helical tube has a first portion disposed in the first chamber, a second portion disposed in the second chamber, a third portion disposed in the third chamber, and a fourth portion disposed in the fourth chamber wherein the fourth portion of the tube forms an inner and outer coil.

28. The heat exchanger of claim 27, wherein the helical tube has a tube fluid flow therethrough, the first chamber has a first fluid flow therethrough, the second chamber has a second fluid flow therethrough, the third chamber and the fifth chamber have a third fluid flow therethrough, and the fourth chamber has a fourth fluid flow therethrough.

29. The heat exchanger of claim 28, wherein, the tube fluid flow is in heat exchange relation with the first, second, third, and fourth fluid flows.

30. The heat exchanger of claim 29, wherein the tube fluid flow and the first fluid flow are in a counter-flow relationship in the first chamber, the tube fluid and the second fluid flow are in a counter-flow relationship in the second chamber, the tube fluid flow and the third fluid flow are in a counter-flow relationship in the third chamber.

31. The heat exchanger of claim 29, wherein the fourth portion of the tube forms an inner coil and an outer coil, wherein the tube fluid flow in the outer coil flows in a parallel relationship with the fourth fluid flow in the fourth chamber and the tube fluid flow in the inner coil flows in a counter-flow relationship with the fluid flow in the fourth chamber.

32. The heat exchanger of claim 29, wherein the tube fluid flow in the inner coil flows in a parallel-flow relationship with the fluid flow in the third and fifth chambers.

33. The heat exchanger of claim 29, wherein the tube fluid flow in the outer coil flows in a counter-flow relationship with the fluid flow in the third and fifth chambers.

34. The heat exchanger of claim 29, wherein the fourth fluid flows in a counter-flow relationship with the fluid flow in the third and fifth chambers.

35. The heat exchanger of claim 28, wherein the first, second, third, and fourth chambers are generally cylindrical.

36. The heat exchanger of claim 27, further comprising an inlet cone in flow communication with one end of the heat exchanger and a diffuser defining a plurality of openings therein positioned downstream of the inlet cone.

37. The heat exchanger of claim 36, wherein the inlet cone further comprises an inside surface and an outside surface, wherein the outside surface is coated with an insulating material, so that the outside surface of the inlet cone has a lower temperature than the inside surface of the inlet cone.

38. The heat exchanger of claim 36, further comprising an exit cone in flow communication with the opposite end of the heat exchanger, wherein the exit cone comprises an inlet, an outlet, an inner cone, and an outer cone, wherein the inner cone has a spiral fin extending between the inner cone to the outer cone to form a spiral flow path between the inner cone and the outer cone.

39. The heat exchanger of claim 38, wherein the exit cone further comprises an inside surface and an outside surface, wherein the outside surface is coated with an insulating material, so that the outside surface of the exit cone has a lower temperature than the inside surface of the exit cone.

40. The heat exchanger of claim 39, further comprising a flame retarding element positioned in flow communication with the third fluid flow exiting the heat exchanger.

41. The heat exchanger of claim 40, wherein the flame retarding element is a mesh screen.

42. The heat exchanger of claim 38, wherein the spiral flow path causes sparks and flames present in a fluid flow to rest.

43. The heat exchanger of claim 36, further comprising at least one fluid inlet in flow communication with the inlet cone.

* * * * *